April 25, 1939. O. L. STARR 2,155,776
COMPRESSION IGNITION ENGINE
Filed July 6, 1937 2 Sheets-Sheet 1
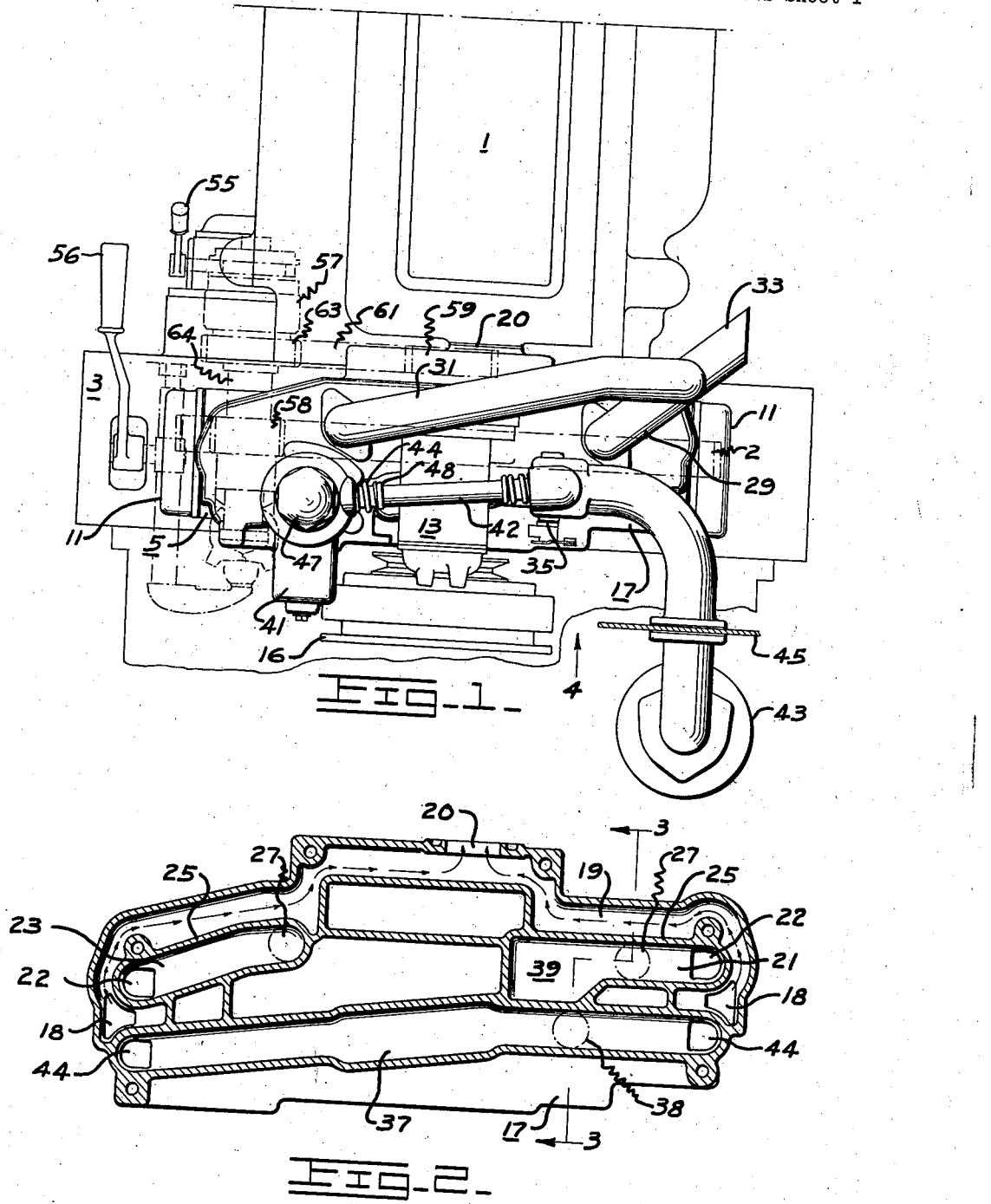
INVENTOR
OSCAR L. STARR
BY Charles M. Fryer
ATTORNEY April 25, 1939.
O. L. STARR
2,155,776
COMPRESSION IGNITION ENGINE
Filed July 6, 1937
2 Sheets-Sheet 2
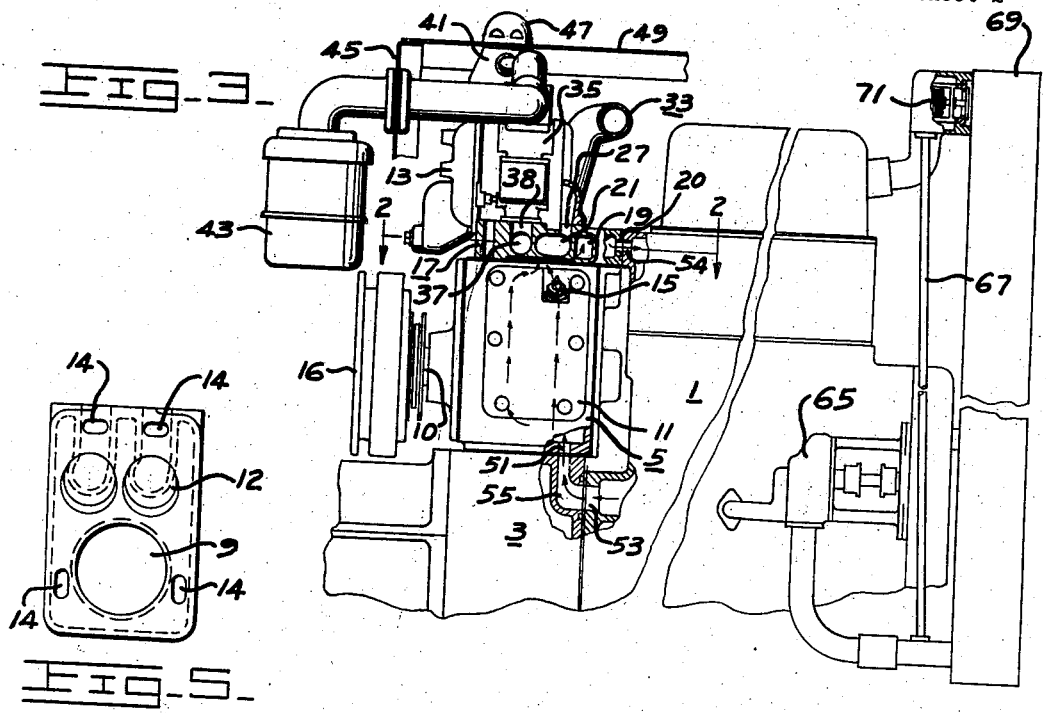
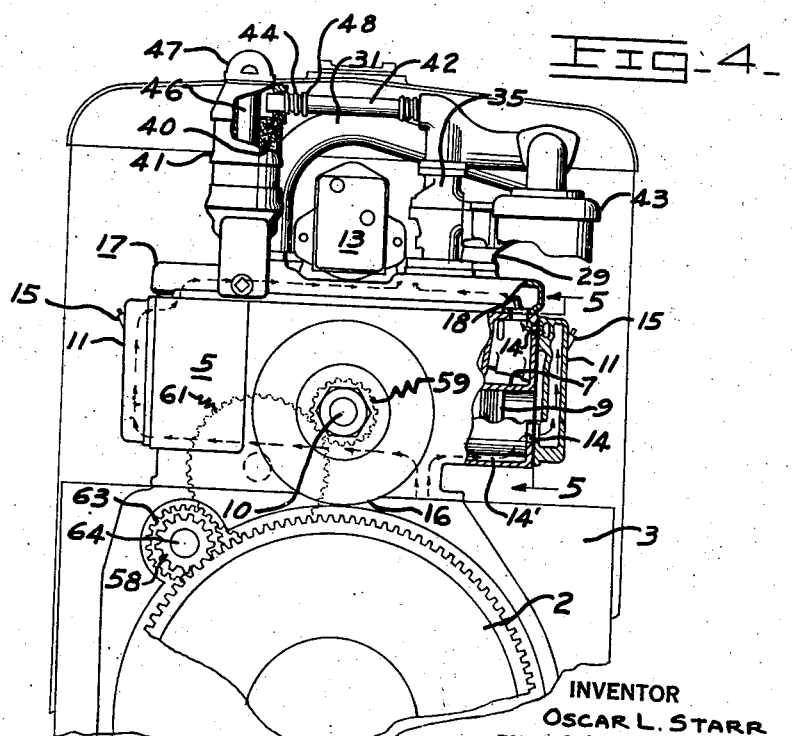
INVENTOR
OSCAR L. STARR
BY Charles M. Fryer
ATTORNEY Patented Apr. 25, 1939

2,155,776

UNITED STATES PATENT OFFICE 2,155,776

COMPRESSION IGNITION ENGINE

Oscar L. Starr, Mission San Jose, Calif., assignor to Caterpillar Tractor Co., San Leandro, Calif., a corporation of California Application July 6, 1937, Serial No. 152,089

14 Claims. (Cl. 123—173)

My invention relates to engines of the compression ignition type, more particularly to means for simplifying starting of an engine of this character.

Engines of the compression ignition type, among which may be classified the Diesel engine, ignite the fuel therefor by compression of the air drawn into the cylinders. Comparatively low volatile fuel is generally utilized in engines of this type, and is injected into the cylinders usually in the form of a very fine spray, where heat of compression ignites the fuel and causes operation of the engine. Due to the necessarily high compression characteristics of an engine of this type, it has been the practice to utilize some power means for starting purposes.

While some compression ignition engines are so designed as to start as engines of the spark ignition type, that is by utilizing highly volatile fuels and spark ignition for starting, applicant has found it more desirable to utilize a separate and smaller engine of the spark ignition type, of a power sufficient to crank the larger main compression ignition engine, and supply heat for heating up the main engine preparatory to starting.

In many prior constructions utilizing this mode of starting, the starting engine is mounted on the side of the main engine and connectible to the flywheel of the main engine through suitable gear and clutch mechanisms. This arrangement is quite satisfactory with engines of the larger size, particularly in connection with their use in tractors, since the space available under the hood on such machines is generally sufficient to provide for an installation of this character.

In tractors of lower power and smaller construction, the space under the hood is insufficient to permit of the installation of a starting engine mounted on the side of the main engine. To mount the starting engine in this manner would cause it to extend over the track mechanism if the tractor is of the track type, and not only create an unbalanced and unappealing appearance, but in that position, it would obstruct the view of the operator.

It is accordingly an object of my invention to provide an improved starting engine assembly which shall not only provide unobstructed view by the operator but which shall:

(1) Provide quicker starting;
(2) Utilize a starting engine to best advantage;
(3) Result in a compact arrangement; and
(4) Provide an improved breather assembly to assure operation of the starting engine free from the ravages of dust or other foreign matter.

The invention in general relates to a starting engine so designed as to be sufficiently compact to make it possible to utilize a small space made available under the hood, behind the main engine, and in alignment therewith, without the necessity of raising or widening the engine hood to accommodate the starting engine. The starting engine is designed to run hot by efficiently utilizing the heat of its exhaust to provide rapid heating of cooling water, and facilitate vaporization of fuel at its carburetor, all of which contribute to the improved manner in which the starting engine performs its function of starting the main engine.

For a more detailed description of my invention, reference is made to the accompanying drawings all of which are substantially to scale, wherein:

Fig. 1 is a plan view of a starting engine and breather system, and that much of the main engine which serves to illustrate the tie-up and cooperation between the two engines.

Fig. 2 is a horizontal section view through the cover of the starting engine to expose the manifold construction therein. The plane of the section is along the line 2—2 of Fig. 3.

Fig. 3 is a view in side elevation of the apparatus of Fig. 1 with a portion of the engine cover in section along the line 3—3 of Fig. 2.

Fig. 4 is a rear elevational view of the starting engine, looking in the direction of the arrow 4 in Fig. 1, a portion of the cylinder block and cylinder head, and engine block cover being broken away to illustrate the flow of cooling water therethrough, and a portion of the breather and filler broken away to show its inner assembly.

Fig. 5 is an end view of the starting engine block with the cylinder head removed.

The main engine 1, which is particularly applicable as the power plant of a track-type tractor, is provided with a flywheel 2 enclosed in a bell housing 3 at the rear thereof and substantially below the upper level of the engine, the flywheel being mounted on one extremity of the crankshaft of the engine. By erecting the dashboard to the rear of the bell housing instead of in a plane adjacent the rear end of the engine proper, as is the practice in connection with construction of the larger tractors, a small space is made available under the hood, immediately above the flywheel housing and at the rear of the main engine. The starting engine of my invention has been designed to be sufficiently compact to fit within this small available space behind the main engine, and yet embody the features which will be described, and which render this starting engine particularly satisfactory for operation as such in the starting of the main engine. Its position behind the main engine and immediately above the flywheel affords advantages over prior constructions, where the starting engine is mounted on the side of the main engine, in that one obtains a balanced assembly which lends itself to the use of the shortest connections between the two engines, as will be pointed out; and otherwise provides a rigid assembly.

The engine 5, which I have found lends itself most admirably for use as a starting engine in the small compact space available behind the main engine, is an opposed piston type engine, preferably of the spark ignition class. An engine of this type, only one end of which is shown exposed in Fig. 4, is provided with horizontal cylinders 7 and pistons 9 and derives its name from the fact that the pistons are operated from a centrally located crankshaft 10 in opposing relationship to each other, that is, they are positioned 180 mechanical degrees out of phase. The location of the pistons as described, permits of the construction of an engine having its greatest dimension horizontally, and being relatively low in height, thus enabling the engine to occupy a minimum vertical space transversely of the main engine. This type of engine requires a pair of cylinder heads 11 one at each end of the engine wherein are provided water jackets connected through openings 14 in the cylinder block with water channels 14' in such block, for the circulation of cooling water around such vital operating elements as the cylinders 7, and valves 12, and also around the cylinder walls to more efficiently effect cooling of the same. The engine operating as a spark ignition type, is also provided with the necessary spark circuits including such elements as a magneto 13 and the spark plugs 15, it being understood that both ends of the engine are similar. A flywheel 16 mounted on the crankshaft of the starting engine, is grooved in the well known manner to permit of turn of rope thereabouts for cranking purposes.

It is in connection with an engine of this character that I have embodied features for attributing to this engine characteristics for producing a starting engine of high efficiency, and one which is capable of fulfilling the objects of my invention.

One of the characteristics which a starting engine should possess to perform its function properly, in addition to providing power sufficient to crank the main engine, is to provide sufficient heat within a short period of time in order to properly condition the main engine in preparation for starting. To accomplish this, I provide an engine block cover 17 for the starting engine having a manifold arrangement provided therein which will efficiently utilize the heat of exhaust to warm up the water in the water jackets of the starting engine; and couple this cooling system of the starting engine to that of the main engine so that the heat absorbed by the cooling system of the starting engine will be transferred through to the main engine, where it will serve to soften up such oil films as may have formed and which normally introduce heavy starting resistance in a cold engine; as well as warm up the main engine preparatory to starting.

Due to the fact that the cooling system of the starting engine entails a flow of water upwardly through each cylinder head 11, the water passage 19 in the engine block cover 17 extends the complete length of the cover and serves to receive the upward flow of cooling water from each cylinder head 11 through ports 18, and conduct it toward an exit 20 or opening provided in the vertical front wall of the cover at a point substantially midway between the ends of the cover. The exhaust gases from each cylinder are conducted from exhaust ports 22 through passages 21 and 23 respectively, also provided in the cover, there being a passage associated with the exhaust valve of each cylinder. These exhaust passages extend for some distance adjacent the water passage 19 and are separated therefrom merely by the presence of a thin metallic wall 25 having high heat conductive qualities; and an exit 27 through the roof of the cover is provided for each exhaust manifold at which points are attached, by suitable flanges and gaskets, exhaust pipes 29 and 31 respectively, which are subsequently merged into a single exhaust pipe 33 to conduct the products of combustion to the atmosphere.

One of the exhaust passages 21 is so designed as to serve a dual purpose. Not only is it utilized to transfer heat to the cooling water flowing from one of the cylinder heads, but it also serves to facilitate vaporization of the carbureted mixture from the carburetor 35 which constitutes a source of fuel supply for the cylinders.

The carburetor is mounted on the roof of the cover and receives its ingredients of gasoline and air from suitable sources externally of the engine. The above ingredients are mixed in proper proportions in the carburetor and passed into an intake manifold 37, also formed in the cover of the starting engine, and spaced from the exhaust passage 21 by a relatively thin metallic wall, through which manifold the mixture is conducted to the cylinders by way of the ports 44.

The particular exhaust passage 21 to which the dual function has been assigned, terminates in an enlarged chamber 39 extending adjacent to the entrance 38 of the carbureted mixture into the fuel inlet manifold 37 of the cover. The outlet 27 of this exhaust passage is located at a point where the passage begins to enlarge, and as a result, the enlarged chamber constitutes a reservoir of heat which is transferred to the carburetor mixture to facilitate vaporization of the same, in addition to being transferred to the cooling water of the adjacent water passage 19.

It has been found that due to breathing of the engine, dust is prone to be sucked in through the breather 41 in addition to that drawn in through the carburetor 35, and in a short time, finds its way in among the moving parts where it results in excessive wearing down and roughening of the precisioned surfaces. The life of a starting engine is materially affected by the entrance of such dust or grime into the bearings and among the operating parts. This becomes a serious problem, particularly in tractor operation, due to the fact that tractors usually operate under conditions which are quite unfavorable in this respect.

Breathing of an engine is due to the alternate escaping of gases and fumes from a cylinder past the piston rings into the crankcase, and the taking in of fresher air into the crankcase, all in response to piston movements. It is customary to exhaust such fumes through some screening material 40 in the breather which is designed to permit the fumes to escape without allowing the oil in the crankcase to splash out. Experience has demonstrated that in dusty atmospheres, often created during tractor operation, such breather elements are insufficient protection against the ravages of dust.

I have solved the above difficulty by providing a closed breather system, and this I accomplish by sealing the breather element 41 to the atmosphere, and in lieu of permitting the fumes to pass directly to the atmosphere, I conduct the crankcase fumes from the breather directly into the carburetor 35, through a tube 42, where they mix with the incoming air in proportions, which are insufficient to affect engine performance, and are ultimately exhausted from the engine through the exhaust valves of the cylinders in the normal course of engine operation.

The tube 42 is sealed to the breather 41 by means of a rubber gasket surrounding the tube and being maintained in compression against the opening from the breather by a spiral spring 44 around the tube and abutting a circumferential ridge or bead 48 formed thereon. The other end of the tube 42 is sealed to the carburetor inlet pipe in a similar manner. By reason of the manner of sealing the tube 42 to the breather and carburetor, it may very readily be removed if desired, merely by pulling or pushing the tube against the compression of either of the spiral springs until one end of the tube is pulled free of its sealing connection. Withdrawal of the other end then becomes a simple matter.

The carburetor is also effectively closed to dust in the atmosphere by conducting air thereto through any suitable air filter 43 which may be conveniently mounted upon the dash 45 of the tractor. In the above manner of interconnecting the breather 41 and carburetor 35 and providing an air filter 43 in conjunction therewith, a breather system is evolved which is effectively closed to the entrance of dust from the atmosphere.

The breather element embodies an oil filler tube 46 and cap 47 and extends sufficiently above the starting engine, so that the filler tube and its cover protrudes slightly above the hood 49 of the main engine, through an opening provided therein for the purpose. This construction is not necessitated by any lack of space below the engine hood, but is intended to provide accessibility to the filler tube from the operator's station, so that oil may be conveniently supplied to the crankcase with ease.

The starting engine, by reason of its being closely positioned to the main engine, has its water jacket coupled to that of the main engine without the necessity of resorting to pipes or conduits. Connecting passages or channels 51, 53 and 54 formed in the blocks of the respective engines and a short channel 55 in the bell housing are all that is necessary in the construction shown, gaskets being relied on to assure water tight connections. These channels are so located that cooling water in the main engine enters the starting engine through the bell housing 3 of the main engine flywheel, where the water divides into two paths through the starting engine block and upward through each cylinder head 11 by way of the openings 14 and then through port 18 to the manifold 19 in the cover 17 as described above, from which it passes to the central opening 29 back into the cooling system of the main engine. The line of arrows applied to the figures of the drawings will serve to outline the course of the cooling water system.

In starting the main engine, the starting engine is cranked by giving its flywheel a turn or two with the aid of a rope wrapped therearound and when brought into operation, is permitted to run without load to effect heating of the water in the cooling system. The flow of heat through the common water cooling system of the engines tends to soften and loosen up congealed oil films and otherwise condition the main engine. When this condition has been obtained, a drive connection is manually effected between the starting engine and the flywheel of the main engine through suitable gear and clutch mechanism illustrated schematically in Fig. 1 and Fig. 4, and including a control handle 56 for bringing a driving pinion 58 into engagement with the main engine flywheel 2, and a clutch control lever 55 for actuating a clutch 57 to bring about a driving connection between the crankshaft of the starting engine and the pinion 58 through a series of gears 59, 61 and 63, the last of which is clutch connected to the shaft 64 on which the driving pinion 58 is fixed. This permits cranking the main engine against compression, to create temperatures in the cylinders sufficient to ignite the fuel charge. The main engine will then become self-operating and the starting engine will be disconnected therefrom.

My improved starting engine and assembly with the main engine offers additional advantages when the main engine is fitted up with a pump 65 for effecting positive circulation of the cooling medium, and when the main engine is also provided with a by-pass 67 around the radiator 69 and the thermostat 71 for controlling the flow of the cooling medium through the radiator. At the instant that the starting engine is coupled to the main engine to crank the same, the pump is set to working by reason of its connection to the main engine, and this insures a rapid transfer of the heat developed by the hot running starting engine to the main engine where it is required. Incidentally, the cranking of the main engine imposes a substantial load on the starting engine causing it to develop heat at a quicker rate than when running light, and due to the positive circulation of the cooling medium by the pump through both engines, this additionally developed heat is rapidly conveyed to the main engine, and at the time when it is most desirable.

The presence of the thermostatically controlled by-pass on the main engine maintains the cooling medium free of the cooling influence of the radiator and its customarily associated fan, and blocks off the large amount of the cooling medium contained in the radiator, until the temperature of the cooling medium in the engine blocks reaches a certain predetermined operating temperature. Thus the block off effect of the thermostat not only removes the cooling effect of the radiator but also very materially reduces the amount of the cooling medium to be heated by the starting engine, whereby the desired starting temperature will be reached in a decidedly shorter period of time.

From a description of my invention as set forth in detail above and in connection with the accompanying drawings, it will be apparent that the objects of my invention have been fulfilled by the engine construction and assembly illustrated.

While I have disclosed my invention in its preferred embodiment only, it will be apparent that the disclosure is subject to variations without departing from the principles of the invention involved. I, therefore, do not desire to be limited in my protection to the specific details of my invention as disclosed, except as may be necessitated by the prior art and the appended claims.

I, therefore, claim as my invention:

1. In combination, a main engine of the compression ignition type having a flywheel at one end and below the upper level thereof to define a space above said flywheel, a starting engine of the spark ignition type of a size to substantially occupy said space above said flywheel, said starting engine having horizontally opposed pistons and cylinders, a cylinder head at either end of said starting engine having a passage formed therein, an engine block cover for said starting engine also having a passage formed therein, and a cooling system common to both said main engine and said starting engine, said cooling system including said passages.

2. An engine of the internal combustion type having horizontally opposed cylinders and pistons, a cover for said engine having an exhaust passage therein terminating in an enlarged chamber, and a cooling water passage in said cover extending adjacent said exhaust passage and in heat transfer relationship thereto.

3. An engine of the internal combustion type having horizontally opposed pistons and cylinders, a cylinder head at each end of said engine embodying a passage for the flow of a cooling medium, a cover for said engine having an exhaust passage formed therein for each of said cylinders, and means for continuing the flow of said cooling medium from said cylinder heads through said cover in heat transfer relationship to said exhaust passages.

4. In combination, a main engine of the compression ignition type, an auxiliary starting engine positioned at and facing one end of said main engine so as to extend transversely across said main engine, each of said engines being water jacketed, and means for coupling the water jacket of one engine to that of the other to provide a cooling system common to both engines.

5. In combination, a main engine of the compression ignition type, an auxiliary starting engine positioned at one end of said main engine and in alignment therewith, each of said engines being water jacketed, means for coupling the water jacket of one engine to that of the other to provide a cooling system common to both machines, a hood over said engines, said hood having a portion above said auxiliary starting engine removed to provide an opening therethrough, and an oil filler tube mounted on said starting engine and extending upwardly through said opening.

6. In combination, a main engine, an auxiliary starting engine therefor, said main engine being jacketed to provide for the flow of a cooling medium therethrough, a cooling medium radiator for withdrawing heat from said cooling medium during normal operation of said main engine, means for utilizing the heat of exhaust of said starting engine to warm up the cooling medium of said main engine, and means for rendering said radiator ineffective during the warming up period by said starting engine when said cooling medium is unheated.

7. In combination, a main engine, a starting engine, a cooling system common to both said engines, said starting engine being in surface to surface connection with said main engine to provide a pipeless connection between said engines for the flow of cooling medium from one engine to the other.

8. In combination, a main engine, a starting engine mounted to the rear of said main engine and in alignment therewith, and a cooling system common to both said engines, said starting engine being in surface to surface connection with said main engine to provide a pipeless connection between said engines for the flow of cooling medium from one engine to the other.

9. In a track-type tractor, a power unit comprising a main engine for operating the tractor, an auxiliary engine for starting said main engine, and a cooling system common to both engines, said engines being mounted in surface to surface contact with each other to provide a pipeless connection between said engines for the flow of cooling medium from one engine to the other.

10. In combination, a main compression ignition engine having cooling medium space, an auxiliary starting engine of the opposed piston type supported by said main engine adjacent to and facing an end thereof with the axes of said pistons extending transversely of said main engine to thus provide a compact arrangement said starting engine also having cooling medium space, and a cooling medium heat exchange system common to both said main engine and said starting engine including pipeless connections between the cooling medium spaces of said engines.

11. In combination, a main compression ignition engine, an auxiliary starting engine therefor, each of said engines being provided with cooling medium space, means connecting such cooling medium spaces to provide a common cooling medium heat exchange system between said engines, and means for conducting heated exhaust gases from said starting engine in contact with the cooling medium space thereof to enhance heating up of said cooling medium during starting of said main engine.

12. In combination, a main compression ignition engine, an auxiliary starting engine of the opposed piston type adjacent to and facing an end of said main engine with the axes of said pistons extending transversely of said main engine, a cylinder head at each end of said starting engine, a cover for said starting engine also having a cooling medium passage therein, and a cooling medium heat exchange system common to both said main engine and said starting engine, said system including said passages.

13. In combination, a main compression ignition engine, an auxiliary starting engine supported by said main engine adjacent to and facing an end thereof so as to extend transversely with respect to said main engine, a covering member on said starting engine having a cooling medium passage therein, means for conducting medium passage therein, means for conducting starting engine exhaust gases in contact with said cooling medium passage to enhance heating up of said cooling medium therein, and a cooling medium heat exchange system common to both said main engine and said starting engine, said system including said cooling medium passage.

14. In combination, a main compression ignition engine having cooling medium space, a radiator connected to said space for cooling said cooling medium during normal operation of said main engine, an auxiliary starting engine for said main engine also having cooling medium space, means connecting such cooling medium spaces to provide a common cooling medium heat exchange system between said engines to thereby cause the starting engine during the starting operation to heat up said cooling medium and consequently the main engine, means for conducting heated exhaust gases from said starting engine in contact with the cooling medium space thereof to enhance heating up of said cooling medium during starting of said main engine, and means to shut off said radiator during the starting operation when such cooling medium is unheated to thereby substitute the starting engine as a source of heat for the radiator as a cooling medium.

OSCAR L. STARR.